UNITED STATES PATENT OFFICE.

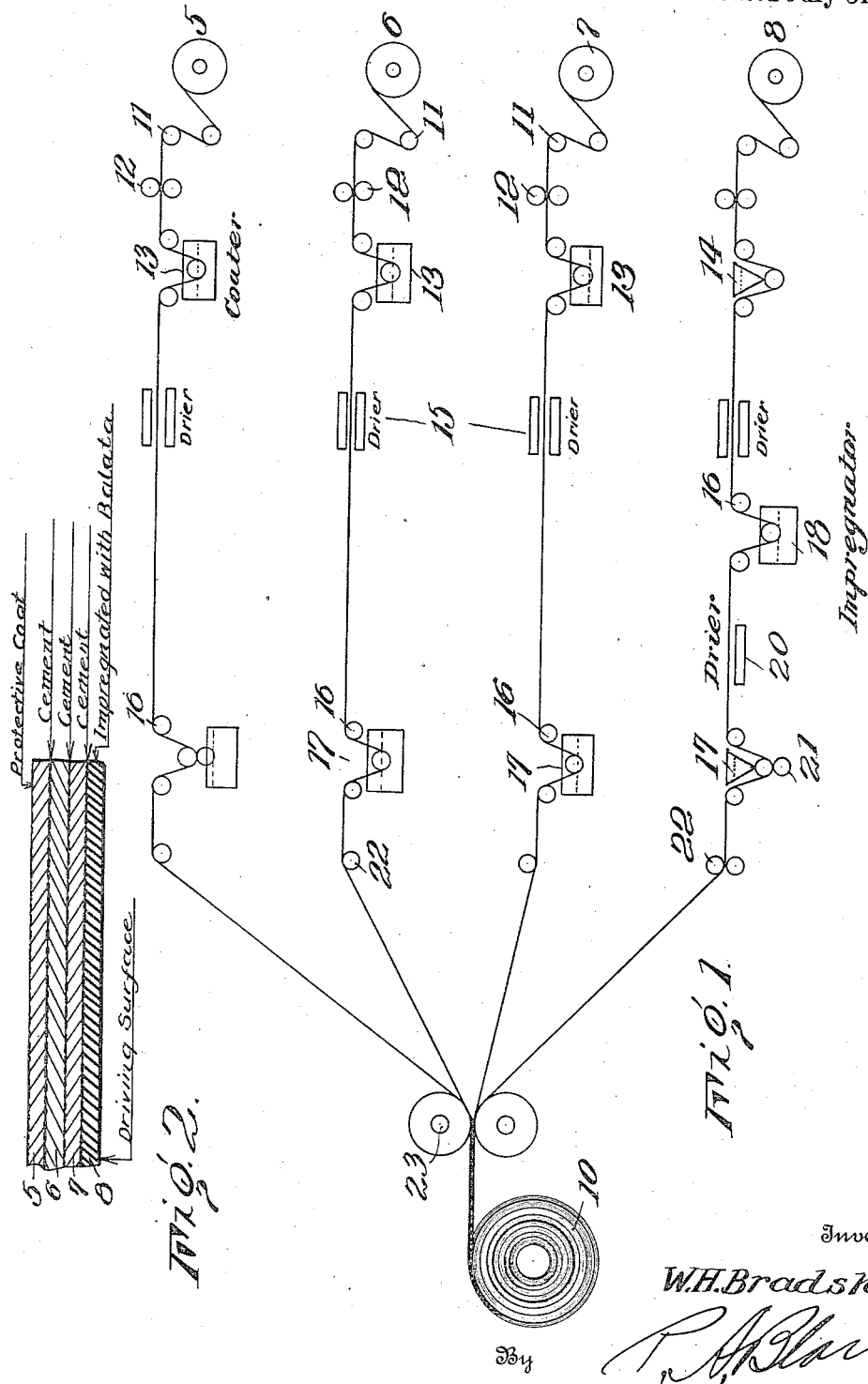

WILLIAM H. BRADSHAW, OF PHILADELPHIA, PENNSYLVANIA, ASSIGNOR TO WILLIAM THOMPSON PLUMMER, OF PHILADELPHIA, PENNSYLVANIA.

BELTING AND PROCESS OF MAKING THE SAME.

1,235,425.   Specification of Letters Patent.   Patented July 31, 1917.

Application filed September 5, 1916. Serial No. 118,456.

*To all whom it may concern:*

Be it known that I, WILLIAM H. BRADSHAW, a citizen of the United States, residing at Philadelphia, in the county of Philadelphia, and State of Pennsylvania, have invented certain new and useful Improvements in Belting and Processes of Making the Same, of which the following is a specification.

This invention relates to belts or belting and a process of making the same.

One of the objects of the present invention is to produce a simple and practically constructed belt having great durability. A further object is to produce a belt which will not be affected by heat arising from excessive slipping. A further object is to produce a belt which will be substantially proof against the action of oil, water, steam, gases, acids and the like, and which can be stored for years in a warm place or subjected to direct sunlight without deteriorating. A further object is to produce a belt which is sufficiently flexible to hug the face of a pulley of relatively small diameter and which will be substantially non-stretchable when transmitting an overload. A further object is to produce a belt which has a high coefficient of friction. A further object is to produce a belt which can be made endless by properly scarfing the ends and then cementing them together. A further object is to provide a process whereby such a belt can be made which will be relatively inexpensive.

Other objects will be in part obvious from the annexed drawings and in part indicated, in connection therewith, by the following analysis of this invention.

This invention accordingly consists in the combined features of construction, the unique relation of the parts and in the relative proportioning and disposition thereof, as well as the several steps of the process and their relation to the other steps, all as more completely outlined herein.

To enable others skilled in the art so fully to comprehend the underlying features thereof that they may embody the same with the numerous modifications in structure and relation contemplated by this invention, drawings depicting a preferred form of belt and process by which it is made have been annexed as a part of this disclosure, and in such drawings like characters of reference denote corresponding parts throughout all views, in which—

Figure 1 is a diagrammatic view, illustrating one of the various ways in which the belt can be made; and Fig. 2 is a diagrammatic view, showing sectionally a portion of the belt.

As conducive to a clearer understanding of the invention, it may be stated that it deals more particularly with the manufacture of that type of belting generally referred to as multi-ply belts, that is, belts made of a plurality of plies of fabric, or the like, superimposed in a direction perpendicular to the plane of the belt. These belts are adapted not only for the transmission of power through the medium of pulleys, but also for use as conveyer and elevator belts. It is highly desirable that belts of this character be strong, durable, flexible, non-stretchable, and substantially fluid and heat proof, and at the same time, possess a high coefficient of friction upon the traction or pulley surface, in order to obtain the maximum efficiency in the transmission of power. I have found that a multi-ply fabric belt, the plies of which are suitably treated and cemented together with a cement, the essential ingredient of which is preferably a cellulose ester, for example, nitrocellulose, cellulose acetate, etc., and the driving face of which is treated with a suitable material to provide a driving surface, preferably with balata, produces a highly efficient and desirable belt and fulfils all these requirements. It is such a belt and a process for manufacturing the same substantially as hereinafter outlined, to which the present invention is especially directed.

It may have been attempted to treat the various plies of a multi-ply belt with a nitrocellulose solution by the impregnation method but the results obtained thereby have been so far as applicant is aware, entirely unsuccessful, due in part to the relative stiffness and tendency to stretch of the finished product. It may have been attempted to merely coat the various plies of fabric with nitrocellulose, as distinguished from impregnating the plies, but an objection has arisen in that when the finished belt was put in use and flexed about a pulley, for example, there was a tendency for the nitrocellulose to crack and flake off and thus eliminate or minimize results and advantages sought to be accomplished thereby.

It is believed that the present invention overcomes these and other objections by the peculiar steps, or combination of steps, including more specifically the sizing of the plies with cement and drying the sizing while the plies are under tension, and cementing and pressing together the various plies of the fabric while under tension. Sizing the plies and drying the sizing while the fabric is under tension serves several purposes, such as, to eliminate the stretch and to prepare the surface for future cementing. If the belt stretches after it is cemented together, the integrity of the cement is broken and it flakes off, allowing the plies to separate. By stretching the plies and then cementing them, or by sizing each ply, drying the sizing while the ply is under tension, and then cementing them, it is possible to eliminate the excessive stretch and so produce a flexible belt the plies of which will not separate. The outer surface of one or both of the outer or exterior plies is preferably treated to increase the coefficient of friction, one of the outer plies may be treated to prevent injury to the belt by water, oil, acid or the like, according to the use to which the belt is put.

Referring now to Fig. 1 of the drawings, in which there is diagrammatically shown one of the various ways of carrying out the present process, 5, 6, 7 and 8 denote the several rolls or plies of fabric, in the present case four in number, although it is, of course, to be understood that more or less plies may be used, as desired. These several plies are unwound from the respective rolls, and are finally wound upon the finishing roll 10 under tension. Separate braking devices 11 are preferably provided adjacent the ply rolls to provide uniform tension. The several plies then pass through calendering rolls 12 where the relatively soft fibers are ironed down smooth and flat before the surfaces of the plies are treated or sized with the nitrocellulose solution, thereby providing a plane surface to which to apply the cement. The solution or cement which I prefer to use for sizing the plies and subsequently cementing them together is made by dissolving celluloid scrap in a solvent containing 10% amylacetate, 20% acetone, 35% wood alcohol, and 35% benzol. The proportion of solvent to scrap depends upon the texture of the fabric used. The upper fabric or ply 5 is preferably sized on both sides, thereby coating what will later be the back of the belt in order to render it fluid proof, while the bottom ply 8 is coated on the top side only, as shown by the coating means 14, leaving the under side clear to be treated subsequently, as will be hereinafter explained. The intermediate plies are provided with means similar to 13 adapted to coat both surfaces. All of these coated plies are then led through a suitable drying apparatus 15 while under tension. The amount of tension required depends upon the type of fabric used. It has been found that good results are obtained by the use of a tension of 20 lbs. per inch of width of single ply when the fabric used is a 10 ounce cotton duck. To make belts for general machine shop use, a 10 ounce cotton duck having a reasonably tight weave is preferably used. The plies then are led past feed rollers 16, when the plies 6 and 7 are again coated on both sides by coating means 17 of any desired type. The top ply 5 is coated on the under or adjacent side only. The bottom ply 8 is at this point 18 treated with a solution or material to increase the coefficient of friction, preferably with balata, in combination with other materials or by itself, which not only coats but impregnates entirely through the ply to the coating of cement applied to its top side by the device 14 and as shown diagrammatically in Fig. 2. This ply is then dried by any suitable drier 20 and passed through a coating device 21 for coating the top surface only with cement. All of the plies then pass over suitable feed rollers 22, during which time the solvent has an opportunity to evaporate partially from the cement, and then through pressing rollers 23 where the several plies are securely united before the cement has completely dried. The plies being under tension will be held in their tensioned position as they are wound upon the final finishing roll 10.

While the present disclosure deals more particularly with a belt made of separate plies, it is to be understood that it may be made from a single sheet of fabric folded back and forth upon itself in a well known manner, and the cement applied thereto in strips by any suitable coating device adapted for that purpose.

From the above, it will be seen that the present invention is directed to a simple and practical belt and the process of manufacturing the same, possessing among others, all of the desirable qualities and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic and specific aspects of this invention, and therefore such adaptations should and are intended to be comprehended within the meaning and range of equivalency of the following claims.

What I claim is:—

1. A belt made of a plurality of plies cemented together with a cement the essential ingredient of which is a cellulose ester, one of the outer plies having all but its inner surface free from said cement but impregnated with a suitable material to provide a driving surface for the belt.

2. A belt made of a plurality of approximately non-stretchable plies, cemented together with a cement, the essential ingredient of which is a cellulose ester, one of the outer plies having all but its inner surface free from said cement but impregnated with a suitable material to provide a driving surface for the belt.

3. A belt made of a plurality of plies cemented together with a cement, the essential ingredient of which is nitrocellulose, one of the outer plies having all but its inner surface free from said cement but impregnated with a suitable material to provide a driving surface for the belt.

4. A belt made of a plurality of plies sized under tension and cemented together with a cement, the essential ingredient of which is a cellulose ester, one of the outer plies having all but its inner surface free from said cement but impregnated with a suitable material to provide a driving surface for the belt.

5. A belt made of a plurality of approximately non-stretchable plies, cemented together with a cement, the essential ingredient of which is a cellulose ester.

6. A belt made of a plurality of plies cemented together with a cement the essential ingredient of which is a cellulose ester, one of the outer plies having all but its inner surface free from said cement but impregnated with balata.

7. The method of making multi-ply belts which consists of the steps of properly stretching the plies longitudinally and cementing them together with a cement, the essential ingredient of which is a cellulose ester.

8. The method of making belts which consists in the steps of calendering a plurality of plies of fabric, sizing the calendered surfaces with a cement, the essential ingredient of which is a cellulose ester, drying said sizing while the plies are under tension and securing the several plies together.

9. The method of making belts which consists in the steps of calendering a plurality of plies of fabric, sizing the calendered surfaces with a cement, the essential ingredient of which is a cellulose ester, drying said sizing while the plies are under tension and cementing the several plies together with such a cement.

10. The method of making multi-ply belts which consists of the steps of stretching the plies longitudinally, cementing them together with a cement, the essential ingredient of which is a cellulose ester, and impregnating the outer face of one of the outer plies with a suitable material to provide a driving surface for the belt.

11. The method of making belts which consists of the steps of calendering a plurality of plies of fabric, sizing the adjacent calendered surfaces with a cement the essential ingredient of which is nitrocellulose, drying said sizing while the plies are under tension, impregnating the outer face of one of the outer plies with balata and cementing the plies together with a nitrocellulose cement.

12. The method of making multi-ply belts which consists of the steps of preliminarily stretching the plies of the belt to remove the stretch as much as possible and cementing said plies together with a substantially non-elastic cement, the essential ingredient of which is a cellulose ester.

In testimony whereof I affix my signature in the presence of two witnesses.

WILLIAM H. BRADSHAW.

Witnesses:
JESSIE E. LEA,
MARGARET T. BREEN.